K. ENGEL.
METHOD OF CUTTING UP STOCK.
APPLICATION FILED JUNE 24, 1909.
1,068,489.
Patented July 29, 1913.
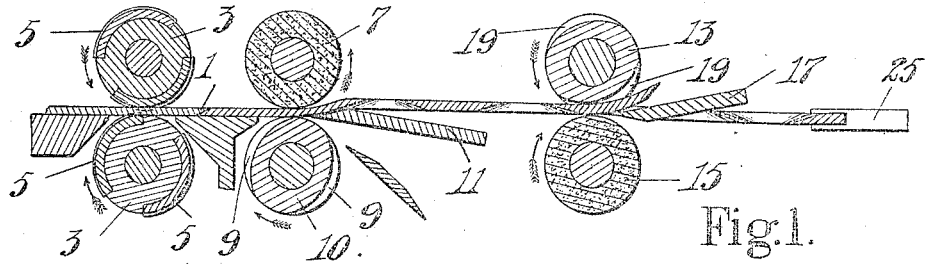
Fig.1.
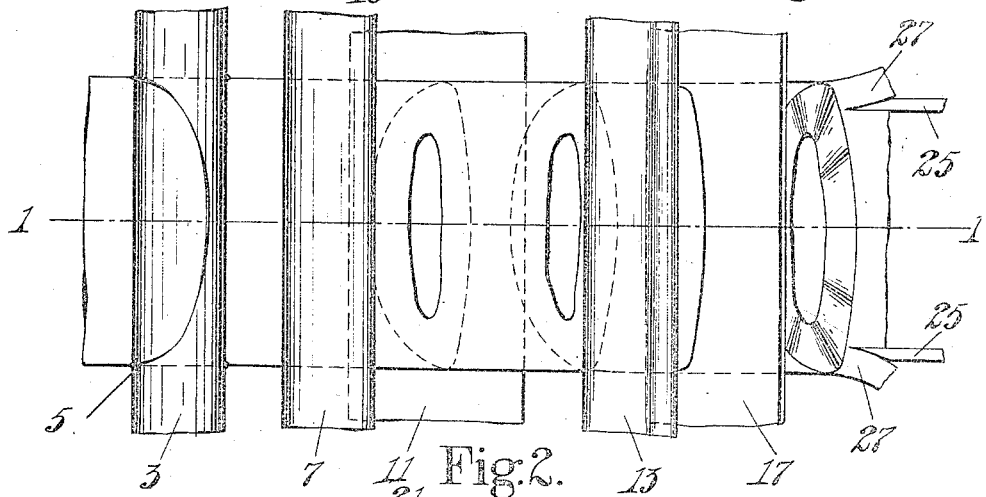
Fig.2.
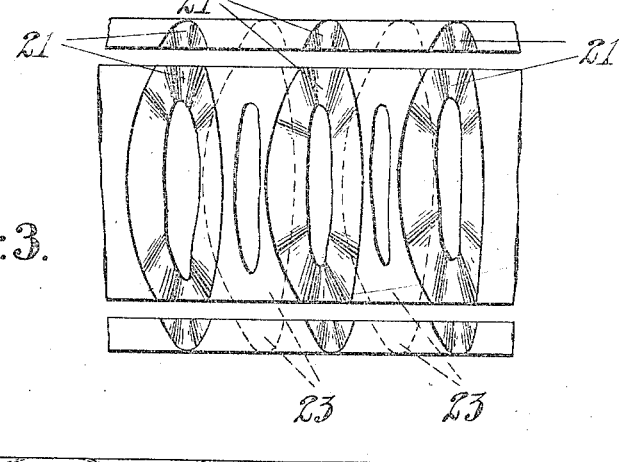
Fig.3.
Fig.4.
Fig.5.
WITNESSES
Elizabeth C. Coupe
Edith C. Holbrook
INVENTOR
Karl Engel
By his Attorney,
Nelson M. Morrow

UNITED STATES PATENT OFFICE.

KARL ENGEL, OF ARLINGTON, MASSACHUSETTS, ASSIGNOR TO UNITED SHOE MACHINERY COMPANY, OF PATERSON, NEW JERSEY, A CORPORATION OF NEW JERSEY.

METHOD OF CUTTING UP STOCK.

1,068,489.  Specification of Letters Patent.  Patented July 29, 1913.

Application filed June 24, 1909. Serial No. 504,111.

*To all whom it may concern:*

Be it known that I, KARL ENGEL, a citizen of the United States, residing at Arlington, in the county of Middlesex and State of Massachusetts, have invented certain Improvements in Methods of Cutting Up Stock, of which the following description, in connection with the accompanying drawings, is a specification, like reference characters on the drawings indicating like parts in the several figures.

This invention relates to a method of cutting material into pieces the edges of which are beveled, and particularly to a method of cutting from stock certain parts used in the manufacture of boots and shoes in such a manner that the maximum amount of stock may be utilized.

For convenience the description will be limited to a method of cutting counters and rands from leather stock, but it should be understood that the method is in no way limited to the articles named since similar articles, such as box toes for example, may be produced if desired and that the nature of the stock from which such articles are cut is immaterial.

Hitherto in manufacturing counters it has been customary first to die out the blanks from the stock, next to run these blanks through a splitting machine in order to bring them to a uniform thickness, and finally to run them through a skiving machine in order properly to bevel their edges. The remnants of stock from the first operation consist of a number of small irregularly shaped pieces more or less connected by narrow strips; from the second operation, of small thin pieces having the outline of the counters from which they were split; and from the third operation, of pieces having the outline of the counter but being otherwise the reverse of the counter:—that is, the edges are thick and gradually taper down so that a hole is left at the center. Although these remnants comprise a large per cent. of the original stock yet because of their size and shape they are unsuited for use in shoe manufacturing and are practically unsalable for any purpose.

The general object of this invention therefore, relates to a method whereby the amount of such waste material is greatly reduced.

One feature of procedure may conveniently consist in dipping or skiving out from one side of a piece of stock a series of similarly placed counters in such a manner that a certain extent of uncut stock is left between the cavities from which the counters have been removed, and a further feature may consist in cutting in any approved manner a second series of counters from the stock which remains between the cavities caused by the removal of the first series. Conveniently, however, the second series of counters may be dipped out by a single operation after the preferred manner of removal of the first series.

Another feature of procedure which may be used in connection with those indicated above consists in outlining the counters by a cut of any desired depth, preferably previously to dipping or skiving them out of the stock. In this way the edges of the counters may be caused to have an appreciable thickness, if desired, and their contours may more easily be made uniform.

In order still further to promote the utilization of stock another feature of procedure consists in using a strip of stock of a width approximately equal to the length of the desired counters and in removing from the stock remaining after the skiving out operation has been finished a plurality of rands.

These and other features of procedure will be explained in the course of the following description and defined in the annexed claims.

The character of the invention may best be understood by reference to the accompanying drawings which show, so far as is essential for an understanding of the invention, certain parts of an illustrative cutting-up machine whereby an exemplary method embodying this invention may conveniently be practiced. The machine itself forms no part of the present invention and will be made the subject of a separate application.

In these drawings:—Figure 1 is a vertical section through certain parts of the machine on the line 1—1 of Fig. 2, a strip of stock being shown in the process of being cut up; Fig. 2 is a plan view of certain parts of the machine and of the stock passing through it; Fig. 3 is a plan of a portion of a strip of stock showing its appearance after the two series of counters have been removed from the opposite sides of said stock. In this figure the two rands are shown as separated from the remaining portion. Fig. 4 is an end view of the strip shown in Fig. 3, and Fig. 5 is an end view of the counters spaced apart but otherwise in approximately the relative positions which they occupied in the stock.

The illustrative machine comprises a plurality of agencies as follows:—an outlining device by which the two series of counters are outlined on opposite sides of the stock, a plurality of dipping or skiving out devices by which the outlined counters are removed from the stock and a plurality of trimming devices by which a rand of approximately triangular cross-section is removed from each edge of the strip of stock.

Before feeding the stock to the machine it is preferably run through a splitting machine to bring it to uniform thickness and then cut into strips of a width equal approximately to the length of the counters desired. These strips are fastened together in any approved manner as by means of cement, a joint of this kind being shown at 1, and the long strip thus produced is then wound upon a drum (not shown) and the free end fed through the machine and attached to a second drum (also not shown). By this arrangement the action of the machine may be rendered continuous so that it will require very little attention.

Turning now to the agencies which effect the various operations upon the stock there is shown an outlining device comprising a pair of rolls 3 into each of which are set a plurality of knives 5 having the contour or contours desired to be produced in the counters. In the illustrated machine these knives are shown as duplicates, but it should be understood that this duplication is not essential and that the knives might have different contours if desired. The rolls 3 are rotated in the direction indicated by any suitable means (not shown), and the knives are so spaced and the rotation of the rolls so timed that there are outlined on opposite sides of the strip of stock by preliminary cuts extending in a direction approximately at right angles to the surface of said stock two series of spaced counters in such a manner that the centers of one series of counters are opposite the spaces between the counters of the other series. This arrangement appears clearly in Fig. 3 wherein is shown a portion of stock with the counters removed therefrom. After having been marked with the outline of the counters the stock passes to the dipping out or skiving out agencies which comprise a plurality of suitable rolls and knives. To dip out or skive out the series of counters outlined by the knives of the lower roll 3 there is provided an upper roll 7 preferably of rubber or similar yielding material, a lower die roll 10 having a plurality of recesses 9, and a knife 11. The rolls may be positively rotated in the direction indicated by any convenient means, and the knife 11 may be supported in any suitable manner. The relation of the knife 11 and rolls 7 and 9 to the rolls 3 is such that the counters outlined by the knives of the lower roll 3 are forced into the recesses 9 and dipped out or skived out by the knife 11. In order to remove from the stock the series of counters outlined by the knives of the upper roll 3 a second skiving out device is provided. This second device is in every way similar to the first one except that the position of its parts is reversed, the die-roll 13 being placed above the yielding roll 15 and the knife 17 having its beveled edge downward. The relation of the knife 17 and the rolls 13 and 15 to the rolls 3 is such that the counters outlined by the knives of the upper roll 3 are forced into the recesses 19 of the roll 13 and removed from the stock by the knife 17. It should be noticed that either of these skiving out or dip-out agencies may be used alone if desired and that by such use it is possible to cut from a piece of stock, each by a single operation, a plurality of finished counters. After the counters have been dipped out of the stock the strip will present the appearance shown in Fig. 3 (except that the rands 27 will not have been removed) wherein the cavities formed by the removal of one series of counters are shown in full lines at 21 while the cavities on the reverse side formed by the removal of the other series of counters are shown in dotted lines at 23. It should be noticed that both series of cavities extend through the stock and that consequently there is left in the central region of the strip only a comparatively slight amount of waste material. At the very edges of the strip, however, owing to the well known thin beveled ends of counters there is left a considerable thickness of material, in fact at the extreme edges approximately ninety to ninety-five per cent. of the original thickness of the stock. The thickness of these edge portions of the stock, however, decreases rapidly toward the central region of the stock so that there exists at each edge a strip or rand of approximately triangular cross section, said rand being attached by its thin portion to the flimsy central portion of the stock. To remove these rands a plurality of knives 25 supported in any suitable manner are provided.

Surveying the method in general in order to determine its advantages, it is seen first that by splitting the hides preparatory to subjecting them to the process described above the waste material for this operation consists of large sheets which may be utilized for various purposes, second that by dipping out two alternate series of counters from opposite sides of the stock a large percentage of the stock which by the old method would have become waste material goes into the counters; and third that by making use of strips of a width equal approximately to the length of the counters a plurality of rands may be obtained from material which by the old method would have been entirely wasted.

In the appended claims the invention is described as an improvement in the art of making counters, but it should be understood that the word "counters" is used merely to promote brevity and that box toes and other similar beveled parts of boots and shoes are intended to be included.

For convenience the method has been described as consisting of a plurality of operations performed in a certain order and resulting in counters of a uniform size, but it should be understood that neither the uniformity in size of the members of the two series of counters nor the precise order of the operations is necessary. It should also be understood that certain of the features may be made use of alone if desired or in combination with certain others without making use of all.

The word "outlining" which appears in the appended claims refers to a preliminary cutting in or impressing upon the stock the outline of the desired counter, the purpose of this procedure being to insure that the edges of the finished counters shall be smooth and regular.

Having described my invention, what I claim as new and desire to secure by Letters Patent is:—

1. That improvement in the art of making counters for boots and shoes which consists in dipping out of the stock a series of counters in such a manner that the distance between the adjacent edges of the cavities produced by the removal of said counters is less than the width of a completed counter and then cutting from the stock remaining between said cavities a second series of counters.

2. That improvement in the art of making counters for boots and shoes which consists in removing two series of counters from opposite sides of a piece of stock, the shortest distance between the edges of any two adjacent counters on one side being less than the width of the corresponding counter on the other.

3. That improvement in the art of making counters for boots and shoes which consists in dipping out from opposite sides of a piece of stock two series of counters the edges of which as they lie in said stock overlap.

4. That improvement in the art of making counters for boots and shoes which consists in outlining a series of counters upon a piece of stock and then dipping out said counters.

5. That improvement in the art of making counters for boots and shoes which consists in outlining upon the opposite sides of a piece of stock two series of alternately located counters and then dipping out said counters.

6. That improvement in the art of making counters for boots and shoes which consists in removing from opposite sides of a piece of stock of uniform thickness, each at a single operation, a plurality of finished counters having continuous beveled edges.

7. That improvement in the art of making counters for boots and shoes which consists first in dipping out from one side of a piece of stock of uniform thickness a series of counters, each at a single operation, and then in dipping out in a similar manner a second series of counters from the opposite side of said stock.

8. That improvement in the art of making counters for boots and shoes which consists in dipping out of a piece of stock of uniform thickness a series of counters each having a continuous beveled edge in such a manner that the uncut stock remaining between the cavities produced by the removal of said counters may be used for the production of a second series of counters and then cutting from said uncut stock said second series.

9. That improvement in the art of making counters for boots and shoes which consists in dipping out from one surface of a piece of stock of uniform thickness, each at a single operation, a series of counters in such a manner that the stock remaining between the cavities produced by the removal of said counters may be used for the production of another series of counters, and then cutting from said remaining stock said other series.

10. That improvement in the art of producing from a piece of stock two series of counters which consists in removing from one side of the stock one series of counters in such a manner that the distance between the edges of the cavities thereby produced is less than the desired width of a member of the other series whereby the beveled edges of the members of the respective series as they may be conceived to lie in the stock overlap, and then cutting out said second series.

11. That improvement in the art of making counters for boots and shoes which consists in dipping out from the grain side of a piece of leather a series of counters and then cutting from the flesh side between the cavities thereby produced a second series of counters.

In testimony whereof I have signed my name to this specification in the presence of two subscribing witnesses.

KARL ENGEL.

Witnesses:
 FRED W. GURBORD,
 ARTHUR L. RUSSELL.